United States Patent
Jang et al.

(10) Patent No.: US 8,675,734 B2
(45) Date of Patent: Mar. 18, 2014

(54) METHOD AND APPARATUS FOR CODING AND DECODING USING BIT-PRECISION

(75) Inventors: Euee-Seon Jang, Seoul (KR); Sun-Young Lee, Seoul (KR); Gi-Seok Son, Seoul (KR); Chung-Ku Lee, Incheon (KR)

(73) Assignee: Humax Co., Ltd., Seongnam-si (KR)

( * ) Notice: Subject to any disclaimer, the term of this patent is extended or adjusted under 35 U.S.C. 154(b) by 433 days.

(21) Appl. No.: 12/694,245

(22) Filed: Jan. 26, 2010

(65) Prior Publication Data

US 2010/0128781 A1 May 27, 2010

Related U.S. Application Data

(63) Continuation of application No. 12/669,770, filed as application No. PCT/KR2008/004232 on Jul. 18, 2008.

(30) Foreign Application Priority Data

| Jul. 18, 2007 | (KR) | 10-2007-0071779 |
| Feb. 20, 2008 | (KR) | 10-2008-0015213 |
| Mar. 17, 2008 | (KR) | 10-2008-0024643 |
| Apr. 23, 2008 | (KR) | 10-2008-0037856 |

(51) Int. Cl.
H04N 7/32 (2006.01)

(52) U.S. Cl.
USPC ............ 375/240.12; 375/240.01; 375/240.02; 375/240.03; 375/E7.243; 341/51

(58) Field of Classification Search
USPC ............ 375/240.12, 240.01, 240.02, 240.03, 375/E7.243; 341/51
See application file for complete search history.

(56) References Cited

U.S. PATENT DOCUMENTS

| 5,781,238 | A | * | 7/1998 | Kondo et al. ............ 375/240.03 |
| 5,963,673 | A | | 10/1999 | Kodama et al. |
| 6,650,762 | B2 | * | 11/2003 | Gibson et al. ................ 382/100 |
| 6,950,466 | B2 | | 9/2005 | Kim et al. |
| 2003/0208488 | A1 | * | 11/2003 | Perrizo ............................. 707/6 |
| 2004/0234150 | A1 | * | 11/2004 | Chang ........................... 382/251 |
| 2006/0291565 | A1 | | 12/2006 | Chen |

OTHER PUBLICATIONS

Won et al. ("Bit-Precision Method for Low Complex Lossless Image Coding"; International Conference on Intelligent Computing, ICIC 2005, Hefei, China, Aug. 23-26, 2005, Proceedings, Part I).*

* cited by examiner

*Primary Examiner* — Christopher S Kelley
*Assistant Examiner* — Maria Vazquez Colon
(74) *Attorney, Agent, or Firm* — Birch, Stewart, Kolasch & Birch, LLP (57) ABSTRACT

Discussed are a method and an apparatus of encoding/decoding by using a bit precision. In accordance to an aspect of the present invention, it is possible to encoding and decoding an image or a video by using a bit precision. Accordingly, compression efficiency can be improved and the decoding complexity can be reduced by encoding/decoding video data by use of the bit precision.

8 Claims, 5 Drawing Sheets

METHOD AND APPARATUS FOR CODING AND DECODING USING BIT-PRECISION

This application is a Continuation of co-pending U.S. application Ser. No. 12/669,770 filed on Jan. 19, 2010, which is a National Phase of PCT/KR2008/004232 filed on Jul. 18, 2008, which claims priority under 35 U.S.C. 119(a) to Korean Patent Application No. 10-2007-0071779, 10-2008-0024643, 10-2008-0037856, and 10-2008-0015213 filed in Korea on Jul. 18, 2007, Mar. 17, 2008, Apr. 23, 2008 and Feb. 20, 2008, respectively. Each of these applications are hereby expressly incorporated by reference into the present application.

TECHNICAL FIELD

The present invention relates to an apparatus for coding and decoding (hereinafter, referred to as coding/decoding), more specifically to a coding/decoding method and apparatus for improving compression efficiency of video data.

BACKGROUND ART

With the increase of data transmission capacity per second through the Internet, there has been an increased amount of multimedia data, including video and picture files, over the past, when simple text data had been mostly transmitted. Accordingly, there has been an increased demand for video compression technologies.

A video is compressed by undergoing an entropy coding, which transforms a bit string indicating a symbol of data to another form. The entropy coding is classified into a Huffman coding and an arithmetic coding. In particular, the Huffman coding is popularly used in many video compression codecs because of its efficient compression and proper decoding complexity. In spite of having high decoding complexity, the arithmetic coding has relatively high compression efficiency. Accordingly, the arithmetic coding is used in the fields which require the high compression efficiency.

The recent advent of low-performance mobile media apparatuses, which runs in limited power, requires an entropy coding method that has less complex decoding. Nevertheless, there have been far less studies on how to make the decoding less complex than how to improve the video compression efficiency.

An entropy coding method using a bit precision has been recently suggested to lower the decoding complexity. However, the entropy coding method has low compression efficiency because of additionally inserting one bit precision into a bitstream per VOP or macroblock.

DISCLOSURE

Technical Problem

Accordingly, the present invention provides a coding/decoding method and apparatus using a bit precision that can improve compression efficiency by selecting an adequate predictor without a generated additional bit.

The present invention also provides a coding/decoding method and apparatus using a bit precision that can lower a decoding complexity and shorten a decoding time by using the bit precision.

The present invention provides a coding/decoding method and apparatus using a bit precision that can encode/decode video data by using an prediction bit precision computed based on an adjacent macroblock, to thereby improve compression efficiency.

The present invention provides a coding/decoding method and apparatus using a bit precision that can encode/decode video data by using a bit precision corresponding to symbols of an adjacent macroblock, to thereby improve compression efficiency and lower decoding complexity.

The present invention provides a coding/decoding method and apparatus using a bit precision that can encode/decode video data by using a bit precision selected by a plurality of methods, to thereby improve compression efficiency.

In addition, the present invention provides a coding/decoding method and apparatus using a bit precision that can encode/decode video data by differently computing a bit precision per each field, to thereby improve compression efficiency.

Technical Solution

An aspect of the present invention features an apparatus capable of encoding video data by using a bit precision.

In accordance with an embodiment of the present invention, an encoding apparatus can include a bit precision computing unit, configured to compute a bit precision per field; a prediction bit precision computing unit, configured to compute a prediction bit precision of a symbol per block; and an encoding unit, configured to encode the symbol by using any one of the bit precision and the prediction bit precision according to a value of the prediction bit precision.

Another aspect of the present invention features an apparatus capable of decoding video data by using a bit precision.

In accordance with an embodiment of the present invention, a decoding apparatus can include a bit precision extracting unit, configured to extract a bit precision from a bitstream; a prediction bit precision computing unit, configured to compute a prediction bit precision of a datum to be decoded of a target block; and a decoding unit, configured to decode the datum to be decoded as a symbol by using any one of the bit precision and the prediction bit precision according to a value of the prediction bit precision.

Advantageous Effects

The present invention can select an adequate predictor without a generated additional bit to improve compression efficiency by providing a coding/decoding method and device using a bit precision The present invention can also lower a decoding complexity and shorten a decoding time by using the bit precision.

The present invention can encode/decode video data by using a prediction bit precision computed based on an adjacent macroblock, to thereby improve compression efficiency.

The present invention can encode/decode video data by using a bit precision corresponding to symbols of an adjacent macroblock, to thereby improve compression efficiency and lower decoding complexity.

The present invention can encode/decode video data by using a bit precision selected by a plurality of methods, to thereby improve compression efficiency.

In addition, the present invention can encode/decode video data by differently computing a bit precision per each field, to thereby improve compression efficiency.

MODE FOR INVENTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

For the convenience of understanding and description, the conception of the encoding method using a bit-precision in accordance with an embodiment of the present invention will be firstly described as follows.

The encoding method in accordance with an embodiment of the present invention determines a bit precision for each symbol of input data. Here, the symbol refers to a word unit, which forms the input data. The bit precision indicates a length of a unit bitstream for encoding each symbol by using a bit or a binary code. For example, if the bit precision is n, an inputted symbol is represented and encoded in the binary code by using the unit bitstreams in the quantities of n.

It is assumed that the inputted symbols are {2, 1, 0, 4, 5 3} and the bit-precision value is 2. Values 0 through 3 can be represented by using two bits. If the symbol value is larger than 3, it is impossible to represent the symbol value by using 2 bits. Accordingly, the symbol value that is larger than 3 is represented by additionally assigning two bits.

In particular, the symbol values "2", "1", and '0' are binarized as "10," "01" and "00." However, since the symbol value "4" is larger than "3" that is the maximum value capable of being represented by using 2 bits, it is impossible that the symbol value "4" is represented by using 2 bits only.

Accordingly, the symbol value "4" is represented by allowing the "3" that is the maximum value capable of being represented by using 2 bits to be represented as "11" and the remainder, "1." to be represented as "01" by using another 2 bits. As a result, the symbol "4" is represented as "1101" by adding another 2 bits to the first 2 bits. Similarly, the symbol value "5" is represented as "1110" by using the maximum value "3" with 2 bits and the remainder "2" with another 2 bits. Even though it is possible that the symbol value "3" is represented by the 2 bits only, the symbol value "3" is represented by additionally using another 2 bits for the remainder "0" as "1100" in order to distinguish what is represented for 3 and more from what is represented for 3.

If the aforementioned coding method using a bit-precision is applied to the symbol values of data of 0 through 9, the symbol values can be represented as shown in the following table 1.

TABLE 1

|   | Bit-precision Value 1 Bit | Bit-precision Value 2 Bit | Bit-precision Value 3 Bit | Bit-precision Value 4 Bit | Bit-precision Value 5 Bit |
|---|---|---|---|---|---|
| 0 | 0 | 00 | 000 | 0000 | 00000 |
| 1 | 01 | 01 | 001 | 0001 | 00001 |
| 2 | 001 | 10 | 010 | 0010 | 00010 |
| 3 | 0001 | 1100 | 011 | 0011 | 00011 |
| 4 | 00001 | 1101 | 100 | 0100 | 00100 |
| 5 | 000001 | 1110 | 101 | 0101 | 00101 |
| 6 | 0000001 | 111100 | 110 | 0110 | 00110 |
| 7 | 00000001 | 111101 | 111000 | 0111 | 00111 |
| 8 | 000000001 | 111110 | 111001 | 1000 | 01000 |
| 9 | 0000000001 | 11111100 | 111010 | 1001 | 01001 |

As shown in the table 1, encoding strings of symbols corresponding to bit precision values are different from each other. Accordingly, it is required to determine which bit precision of various types of bit precisions is used to encode input data before the encoding operation is performed. An encoding compression rate of the input data is also varied depending on the determined bit precision. The symbols to be encoded are encoded by using all bit precisions. Then, the bit precision having the best compression rate is finally selected for the bit precision to be encoded.

For example, if it is assumed that the encoding is performed by using the bit precision values, 1 through 3, all symbols of a certain macroblock is encoded by using the bit precision values, 1 through 3. At this time, if the macroblocks encoded by using the bit precisions, 1, 2 and 3 have the capacities of 3, 2 and 1 Mbyte, respectively, the bit precision 3 is finally selected as the bit precision of the pertinent macroblock.

In accordance with an embodiment of the present invention, an additional bit precision (hereinafter, referred to as an "adaptive bit precision") can be computed corresponding to each symbol in addition to the bit precision. Here, the adaptive bit precision refers to the length of a unit bit string for encoding each symbol. Hereinafter, the adaptive bit precision will be briefly described for the convenience of understanding and description.

Each symbol can be represented in the adaptive bit precision and an adaptive bit string before being inserted into the bitstream. The below table 2 shows the adaptive bit precision and the adaptive bit string of each symbol.

TABLE 2

| Symbol | Adaptive bit precision | Adaptive bit string |
|---|---|---|
| 0 | 0 | — |
| 1 | 1 | — |
| 2 | 2 | — |
| 3 | 3 | 00 |
| 4 | 3 | 01 |
| 5 | 3 | 10 |
| 6 | 3 | 11 |
| 7 | 4 | 000 |
| 8 | 4 | 001 |

The length of each adaptive bit string is determined as a value obtained by subtracting "1" from the adaptive bit precision. For example, if the adaptive bit precision is "3," the length of the pertinent adaptive bit string as "2" (i.e. 2 bits). At this time, if the adaptive bit precision has the values of 0 through 2, the symbol is represented in the adaptive bit precision only without the adaptive bit string. Since the length of each adaptive bit string is a value obtained by subtracting "1" from the adaptive bit precision, the adaptive bit strings can represent the symbols in the quantities of the $n^{th}$ power of 2. Here, n is obtained by subtracting "1" from the adaptive bit precision. For example, the adaptive bit precision, 3, can represent 4 symbols, and the adaptive bit precision, 4, can represent 8 symbols. In the case of the adaptive bit precision, 3, as shown in the table 2, "00," "01," "10" and "11" correspond to 3, 4, 5 and 6, respectively. In the case of the adaptive bit precision, 4, "000," "001," "010," "011," "100," "101," "110" and "111" correspond to 7, 8, 9, 10, 11, 12, 13 and 14, respectively. The aforementioned adaptive bit precision and adaptive bit string are inserted to a bitstream before being transmitted to a decoder. At this time, the adaptive bit precision can be inserted to the bitstream by undergoing an additional process. This will be described in detail below with reference to the related drawings.

Figure 1:
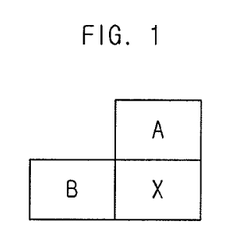
FIG. 1 is a diagram for helping to describe how to compute a prediction bit precision in accordance with an embodiment of the present invention.

FIG. 1 is a diagram for helping to describe how to compute a prediction bit precision in accordance with an embodiment of the present invention.

Referring to FIG. 1, the prediction bit precision refers to the bit precision computed by using symbols pertaining to an upper macroblock and/or a left macroblock of a macroblock (hereinafter, referred to as a "target macroblock") to be currently encoded. For example, as shown in FIG. 1, X refers to the target macroblock. A refers to the upper macroblock, and B refers to the left macroblock. The prediction bit precision of the target macroblock X refers to the bit precision computed by using the symbols included in the macroblocks A and B. The method of selecting the bit precision is the same as described with reference to the table 1. In other words, the symbols included in the macroblocks A and B are encoded, and a bit precision having the smallest encoded capacity is computed as the prediction bit precision of the target macroblock X.

If there is only any one of the upper macroblock and the left macroblock (i.e. there is the target macroblock at the uppermost part or leftmost part of a VOP), the prediction bit precision can be computed by using the symbols of the uppermost or leftmost macroblock. On the other hand, if there is neither the upper macroblock nor the left macroblock (i.e. there is the target macroblock at the lowermost left part), the prediction bit precision is not able to be computed. In this case, the encoding can be performed by using the bit precision computed by use of the symbol pertaining to the pertinent VOP.

Figure 2:
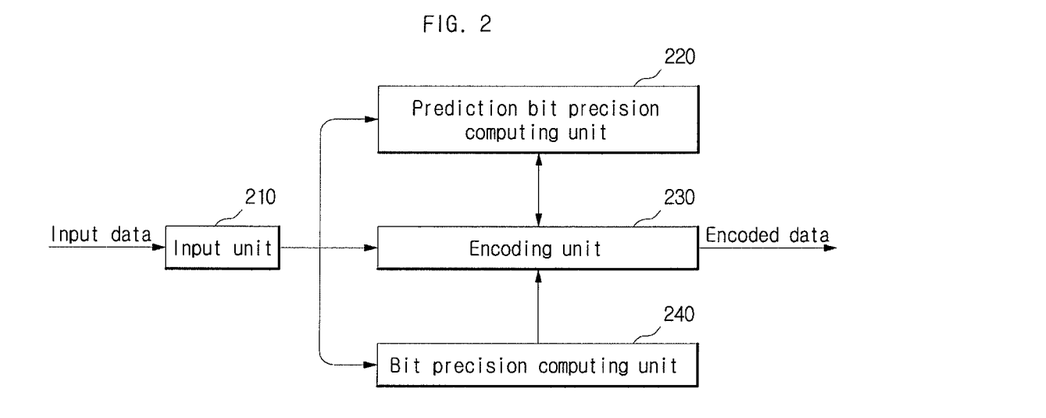
FIG. 2 is a block diagram showing an encoding apparatus using a prediction bit precision in accordance with an embodiment of the present invention.

FIG. 2 is a block diagram showing an encoding apparatus using a prediction bit precision in accordance with an embodiment of the present invention.

Referring to FIG. 2, the encoding apparatus using a prediction bit precision in accordance with an embodiment of the present invention includes an input unit 210, a prediction bit precision computing unit 220, a bit precision computing unit 230 and an encoding unit 240.

The input unit 210 receives input data from the outside and extracts and outputs the symbols to be encoded. At this time, the input unit 210 distinguishes the extracted symbols in units of VOP and macroblock (or block having a predetermined size) and the distinguished symbols and distinguishment information to the prediction bit precision computing unit 220, the bit precision computing unit 230 and the encoding unit 240. At this time, the input data can include at least one of data corresponding to a value, mcbpc, cbpy, mv(motion vector)-x, mv-y, DCT-luma and DCT-chroma. The mcbpc, cbpy, mv(motion vector)-x, mv-y, DCT-luma and DCT-chroma are used in the encoding/decoding operation according to the MPEG standard. This shall be evident to any person of ordinary skill in the art. Accordingly, the detailed pertinent description will be omitted.

The prediction bit precision computing unit 220 distinguishes the received symbols in units of macroblock and computes a prediction bit precision to output it to the encoding unit 240. The detailed operation of computing the prediction bit precision is the same as described above. Accordingly, the pertinent description will be omitted. However, if there is neither the upper macroblock nor the left macroblock of the target macroblock (i.e. there is the target macroblock at the lowermost left part), the prediction bit precision is computed as "0" and outputted. On the other hand, if the upper macroblock and the left macroblock are skipped macroblocks, the prediction bit precision is computed as "0." Information indicating that if the upper macroblock and the left macroblock are skipped macroblocks can be included in the input data or can be additionally inputted from the outside. Since it shall be evident to any person of ordinary skill in the art that the skipped macroblock refers to the macroblock undergoing a skip processing in the encoding operation, the pertinent detailed description will be omitted.

The bit precision computing unit 230 distinguishes the inputted symbols in units of VOP and computes a bit precision to output it to the encoding unit 240. The detailed method of computing the bit precision is the same as described above.

The encoding unit 240 encodes the symbol by using any one of the prediction bit precision and the bit precision inputted from the prediction bit precision computing unit 220 and/or the bit precision computing unit 230.

Below described in detail is the encoding operation of the encoding unit 240.

Firstly, the encoding unit 240 inserts a bit precision of a VOP into a bitstream.

Then, the encoding unit 240 checks whether a prediction bit precision of macroblocks included in the VOP is "0."

As the result of checking it, if the prediction bit precision is 0, the symbols of target macroblock is encoded by using the bit precision of the pertinent VOP.

On the other hand, if the prediction bit precision is not 0, the encoding unit 240 encodes the symbols of the target macroblock by using the prediction bit precision. Then, the encoding unit 240 inserts a bit string of the encoded symbol into the bitstream.

Figure 3:
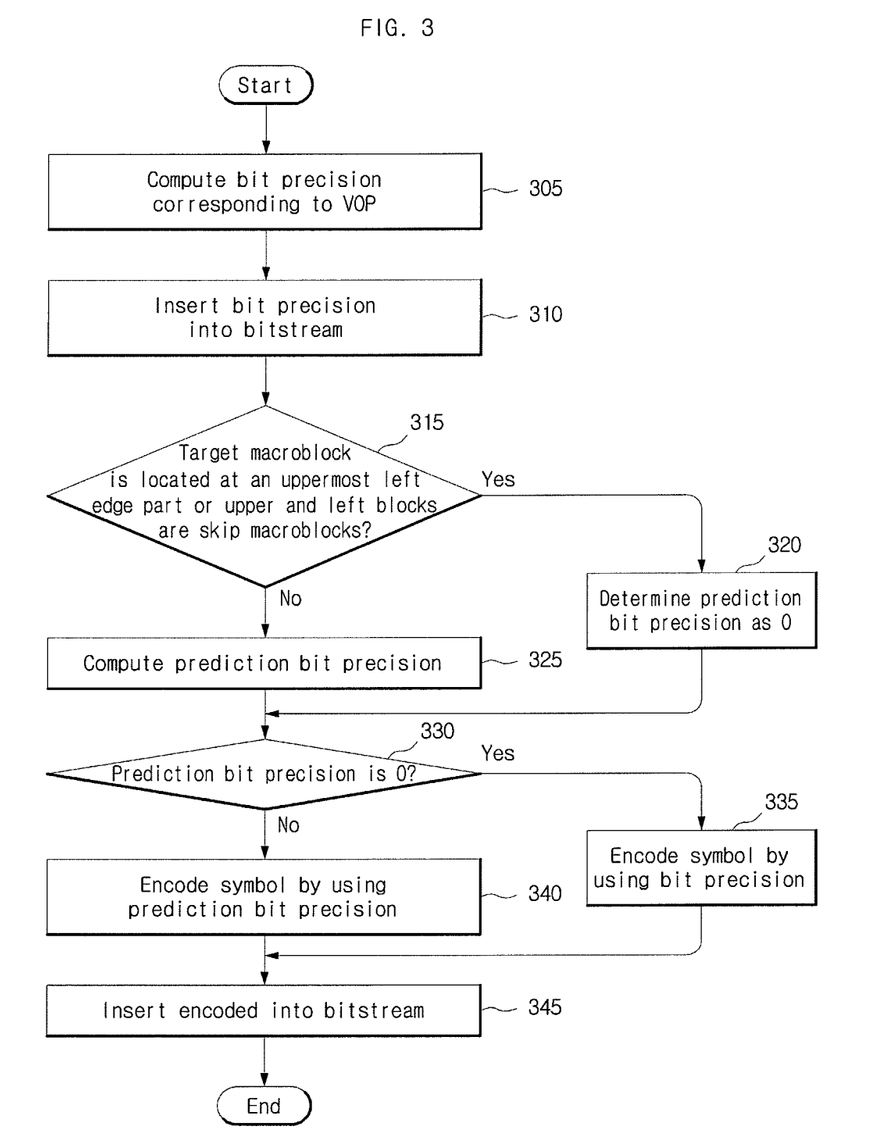
FIG. 3 is a flow chart showing an encoding operation using a prediction bit precision in accordance with an embodiment of the present invention.

FIG. 3 is a flow chart showing an encoding operation using a prediction bit precision in accordance with an embodiment of the present invention. Although the operations to be described below are performed by each inner element of the encoding apparatus, the inner elements are collectively referred to as the encoding apparatus for the convenience of understanding and description.

Firstly, the encoding apparatus computes a bit precision of a VOP in a step represented by 305. At this time, the symbols included in the VOP can have a value indicating one of mcbpc, cbpy, mv(motion vector)-x, my-y, DCT-luma and DCT-chroma. Since the method of computing the bit precision has been described with reference to the table 1, the pertinent detailed description will be omitted.

In a step represented by 310, the encoding apparatus inserts the computed bit precision into a bitstream.

In a step represented by 315, the encoding apparatus checks whether a target macroblock is located at an uppermost left edge part or upper and left blocks are skip macroblocks.

As the result of being checked in the step represented by 315, if the target macroblock is located at the uppermost left edge part or the upper and left blocks are the skip macroblocks, the encoding apparatus determines a prediction bit precision as "0" in a step represented by 320.

However, if the target macroblock is not located at the uppermost left edge part and the upper and left blocks are not the skip macroblocks, the decoding apparatus computes the prediction bit precision by using the upper and/or left macroblock in a step represented by 325.

Then, the encoding apparatus checks whether the prediction bit precision is 0 in a step represented by 330.

If the prediction bit precision is 0, the encoding apparatus encodes symbols of the target macroblock by using the bit precision of a pertinent VOP in a step represented by 335.

However, if the prediction bit precision is not 0, the encoding apparatus encodes the symbols of the target macroblock by using the prediction bit precision in a step represented by 340.

In a step represented by 345, the encoding apparatus inserts the encoded bit string into the bitstream.

Even though the method of encoding symbols of one macroblock has been described above for clear description of the present invention, the encoding apparatus can repeatedly perform the steps represented by 315 through 345 until all symbols of a pertinent frame or VOP are encoded.

Figure 4:
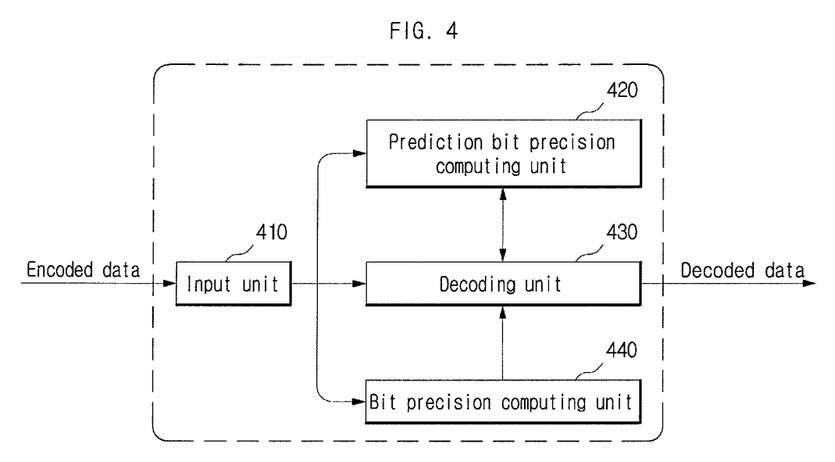
FIG. 4 is a block diagram showing a decoding apparatus using a prediction bit precision in accordance with an embodiment of the present invention.

FIG. 4 is a block diagram showing a decoding apparatus using a prediction bit precision in accordance with an embodiment of the present invention.

Referring to FIG. 4, the decoding apparatus using the prediction bit precision in accordance with an embodiment of the present invention includes an input unit, a prediction bit precision computing unit 420, a decoding unit 430 and a bit precision extracting unit 440.

The input unit 410 receives data encoded by using a bit precision and/or a prediction bit precision from the outside. Then, the input unit 410 outputs the received encoded data to the bit precision extracting unit 440 and the decoding unit 430.

The bit precision extracting unit 440 extracts a bit precision inserted into a decoded bitstream and output the extracted bit precision to the decoding unit 430.

The prediction bit precision computing unit 420 receives a signal requesting a prediction bit precision of a target macroblock and a symbol of a previously decoded macroblock from the decoding unit 430. At this time, the prediction bit precision computing unit 420 can store decoded symbol received from the decoding unit 430 until the decoding operation of a pertinent VOP is ended. After that, the prediction bit precision computing unit 420 computes a prediction bit precision with reference to the encoded symbols of upper and left macroblocks of the target macroblock and outputs the computed prediction bit precision to the decoding unit 430. Since the method of computing the prediction bit precision has been described with reference to FIG. 1, the pertinent detailed description will be omitted.

The decoding unit 430 decodes the encoded data inputted from the input unit 410 by using the bit precision and the prediction bit precision.

Below described in detail is the processing operation of decoding unit 430. The decoding unit 430 extracts a bit string as much as the length of the bit precision value from the encoded data. For example, if the bit precision is assumed to have the value of 3, the decoding unit 430 extracts 3 bits from the encoded data in order to decode an uppermost left macroblock of a VOP. Of course, if the extracted 3 bits is "111," the decoding unit 430 extracts another 3 bits. Here, it shall be obvious that the decoding unit 430 successively extracts each bit from the encoded data. Then, the decoding unit 430 compounds the extracted bits and decodes them as the symbol 8. For example, if "111001" is assumed to be extracted, the decoding unit 430 decodes the extracted 6 bits as the symbol 8 as shown in the table 1. The decoding unit 430 repeatedly performs the extracting and reconstructing operations until all symbols of the uppermost left macroblock of the VOP are decoded. The decoding unit 430 decodes all symbols of the target macroblock before outputting their symbols to the prediction bit precision computing unit 420.

Then, the decoding unit 430 determines the right macroblock of the macroblock decoded in the aforementioned operation as a target macroblock. The decoding unit 430 checks whether the upper and left macroblocks are the skipped macroblocks. At this time, information indicating that the upper and left macroblocks are the skipped macroblocks can be included in the encoded data or can be additionally inputted from the outside. If the upper and left macroblocks are the skipped macroblocks, the decoding unit 430 decodes an encoded string as the symbol of the target macroblock by using the bit precision. The operation of performing the decoding by using the bit precision has been described in the operation of decoding the uppermost left macroblock of the VOP. On the other hand, if the upper and left macroblocks are not the skipped macroblocks, the decoding unit 430, the decoding unit 430 outputs a signal requesting a prediction bit precision of the target macroblock to the prediction bit precision computing unit 420.

After that, the decoding unit 430 receives the prediction bit precision of the target macroblock from the prediction bit precision computing unit 420. Then, the decoding unit 430 extracts an encoded string from the bitstream and decodes the encoded string as the symbol of the target macroblock by using the prediction bit precision. Since the operation of performing the decoding by using the prediction is identical to the operation of performing the decoding by using the bit precision, the pertinent description will be omitted. At this time, if the computed prediction bit precision has the value of 0, the decoding unit 430 performs the decoding by using the bit precision.

Then, the decoding unit 430 determines the right macroblock of the previously decoded macroblocks as the target macroblock. If there is not the right macroblock at all, the decoding unit 430 determines the lower leftmost block as the target macroblock. Since the operation of decoding the symbols of the macroblock is identical to the foresaid decoding operation, the pertinent description will be omitted. After that, the decoding unit 430 outputs symbol data of the decoded macroblock to the prediction bit precision computing unit 420. If all macroblocks in the VOP is completely decoded, the decoding unit 420 ends the decoding of the pertinent VOP.

Figure 5:
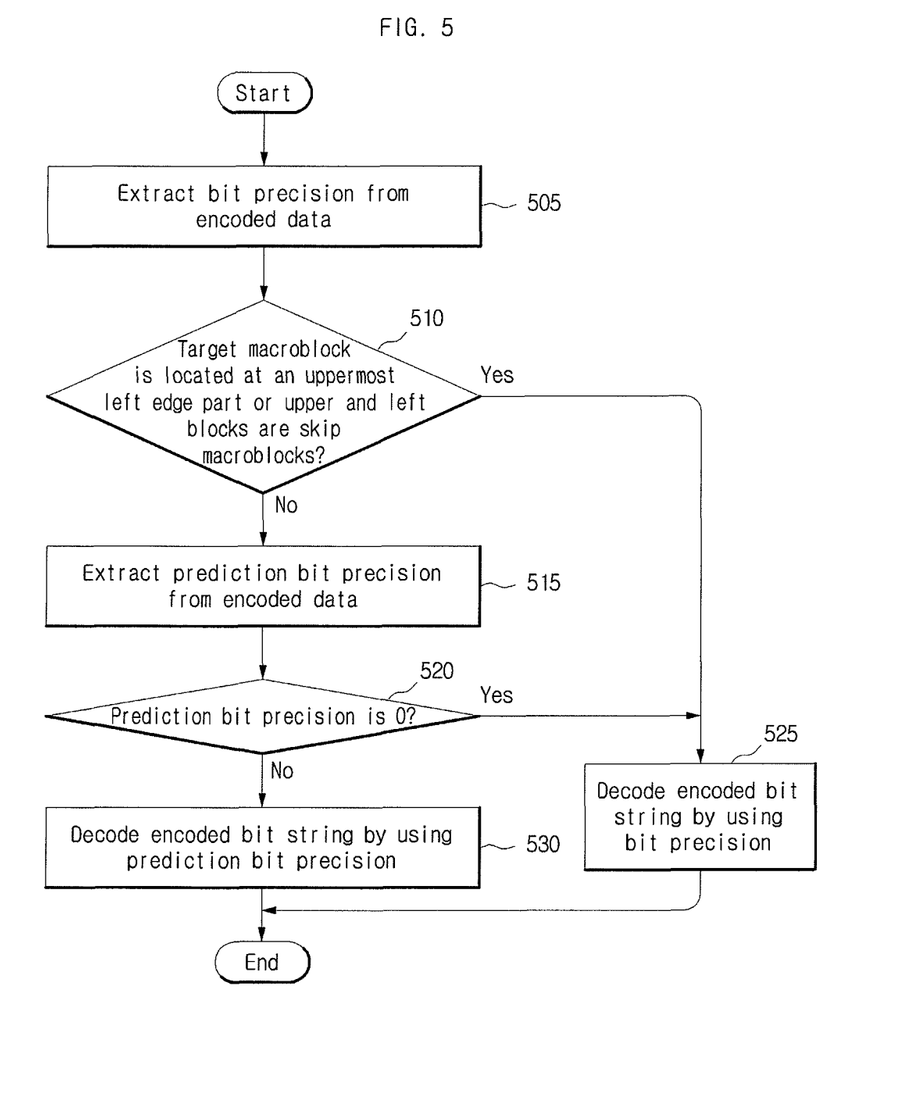
FIG. 5 is a flow chart showing a decoding operation using a prediction bit precision in accordance with an embodiment of the present invention.

FIG. 5 is a flow chart showing a decoding operation using a prediction bit precision in accordance with an embodiment of the present invention. Although the operations to be described below are performed by each inner element of the decoding apparatus 2500, the inner elements are collectively referred to as the decoding apparatus 2500 for the convenience of understanding and description.

Firstly, the decoding apparatus 2500 extracts a bit precision from an inputted encoded data in a step represented by 505.

Then, the decoding apparatus 2500 checks whether a target macroblock is located at an uppermost left or upper and left macroblocks are skipped macroblocks in a step represented by 510.

If the target macroblock is located at an uppermost left or the upper and left macroblocks are the skipped macroblocks, the decoding apparatus 2500 decodes the encoded data by using the bit precision.

However, if the target macroblock is located at an uppermost left or the upper and left macroblocks are not the skipped macroblocks, the decoding apparatus 2500 computes a prediction bit precision of a target macroblock by using symbols of already-decoded upper and/or left macroblock(s) in a step represented by 515.

In a step represented by 520, the decoding apparatus 2500 checks whether the computed prediction bit precision is "0."

If the prediction bit precision is 0, the decoding apparatus 2500 decodes the encoded data by using the bit precision in a step represented by 525.

However, if the prediction bit precision is not 0, the decoding apparatus 2500 extracts an encoded string from a bitstream and decodes the encoded string by using the prediction bit precision in a step represented by 530.

Even though the operation of decoding symbols of one macroblock has been described above for clear description of the present invention, the decoding apparatus 2500 can repeatedly perform the steps represented by 510 through 530 until all symbols of a pertinent frame or VOP are decoded.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention can be applied to a video codec.

The invention claimed is:

1. An encoding apparatus, comprising:
a bit precision computing unit configured to compute a bit precision per field,
wherein the bit precision refers to a length of a unit bit string for encoding a symbol, and a number of bits representing the symbol is a multiple of the bit precision;
a prediction bit precision computing unit configured to compute a prediction bit precision of the symbol per block, the block having a predetermined size,
wherein the prediction bit precision refers to a bit precision having a smallest encoded capacity when symbols of an upper block and a lower block of a target block are encoded by a plurality of predetermined bit precisions; and
an encoding unit coupled to the bit precision computing unit and the prediction bit precision computing unit, the encoding unit configured to
encode the symbol by using the bit precision if a value of the prediction bit precision is "0", and
encode the symbol by using the prediction bit precision if a value of the prediction bit precision is not "0".

2. The apparatus of claim 1,
wherein if an uppermost left block or the upper block and a left block of the target block are skipped blocks, the prediction bit precision computing unit computes the prediction bit precision as zero ("0"), and
wherein, if the uppermost left block or the upper block and the left block of the target block are not skipped blocks, the prediction bit precision computing unit computes the prediction bit precision by using the upper block and the left block.

3. An encoding method, comprising:
computing a bit precision per field,
wherein the bit precision refers to a length of a unit bit string for encoding a symbol, and a number of bits representing the symbol is a multiple of the bit precision;
computing a prediction bit precision of the symbol per block, the block having a predetermined size,
wherein the prediction bit precision refers to a bit precision having a smallest encoded capacity when symbols of an upper block and a lower block of a target block are encoded by a plurality of predetermined bit precisions;
encoding the symbol by using the bit precision if a value of the prediction bit precision is "0"; and
encoding the symbol by using the prediction bit precision if a value of the prediction bit precision is not "0".

4. The method of claim 3, wherein the computing of the prediction bit precision comprises:
if an uppermost left block or the upper block and a left block of the target block are skipped blocks, computing the prediction bit precision of the target block as zero ("0"), and
if the uppermost left block or the upper block and the left block are not skipped blocks, computing the prediction bit precision of the target block by using a least one of the upper block and the left block of the target block.

5. A decoding apparatus, comprising:
a bit precision extracting unit configured to extract a bit precision of a datum to be decoded as a symbol from a bitstream,
wherein the bit precision refers to a length of a unit bit string for encoding the symbol, and a number of bits representing the symbol is a multiple of the bit precision;
a prediction bit precision computing unit configured to compute a prediction bit precision of the datum to be decoded as the symbol of a target block,
wherein the prediction bit precision is computed in units of blocks, the blocks having a predetermined size, and
wherein the prediction bit precision refers to a bit precision having a smallest encoded capacity when symbols of an upper block and a lower block of a target block are encoded by a plurality of predetermined bit precisions; and
a decoding unit coupled to the bit precision extracting unit and the prediction bit precision computing unit, the decoding unit configured to
decode the datum to be decoded as the symbol by using the bit precision if the value of the prediction bit precision is "0", and decode the datum to be decoded as the symbol by using the prediction bit precision if the value of the prediction bit precision is not "0".

6. The apparatus of claim 5, wherein, if an uppermost left block or the upper block and a left block of the target block are skipped blocks, the prediction bit precision computing unit computes the prediction bit precision as zero ("0"), and wherein, if the uppermost left block or the upper block and the left block of the target block are not skipped blocks, the prediction bit precision computing unit computes the prediction bit precision of the target block by using at least one of the upper block and the left block of the target block.

7. A decoding method, comprising:

extracting a bit precision of a datum to be decoded as a symbol from a bitstream, wherein the bit precision refers to a length of a unit bit string for encoding the symbol, and a number of bits representing the symbol is a multiple of the bit precision;

computing a prediction bit precision of the datum to be decoded as the symbol of a target block, wherein the prediction bit precision is computed in units of blocks, the blocks having a predetermined size, and wherein the prediction bit precision refers to a bit precision having a smallest encoded capacity when symbols of an upper block and a lower block of a target block are encoded by a plurality of predetermined bit precisions;

decoding the datum to be decoded as the symbol by using the bit precision if a value of the prediction bit precision is "0"; and decoding the datum to be decoded as the symbol by using the prediction bit precision if a value of the prediction bit precision is not "0".

8. The method of claim 7, wherein the computing of the prediction bit precision comprises:

if an uppermost left block or the upper block and the left block of the target block are skipped blocks, computing the prediction bit precision of the target block as zero ("0"), and if the uppermost left block or the upper block and the left block of the target block are not skipped blocks, computing the prediction bit precision of the target block by using a least one of the upper block and the left block of the target block.

* * * * *